Patented Dec. 16, 1947

2,432,975

UNITED STATES PATENT OFFICE 2,432,975

DINITROSO-DIPHENYL GUANIDINES

Joseph Arthur Teicher, Erdington, Birmingham, and Douglas Frank Twiss, Sutton Coldfield, England, assignors to Dunlop Tire & Rubber Corporation, Buffalo, N. Y., a corporation of New York No Drawing. Application November 10, 1943, Serial No. 509,780
In Great Britain November 17, 1942

4 Claims. (Cl. 260—565)

Our invention relates to the manufacture of derivatives of guanidine which are of particular use in the rubber industry, for example, as plasticising agents for natural rubber or synthetic rubber-like materials.

According to the present invention derivatives of diphenyl guanidine or ditolyl guanidine are obtained by allowing nitrous acid to react with the corresponding aryl guanidine. By this reaction there can be obtained mono- or di-nitroso derivatives according to the following reactions:

(1)
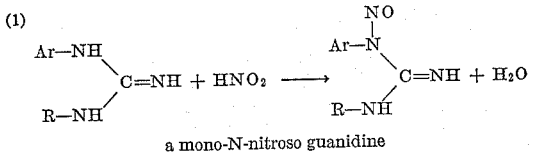
a mono-N-nitroso guanidine (2)
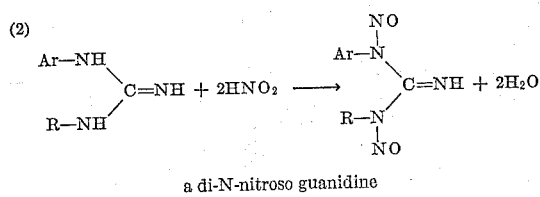
a di-N-nitroso guanidine wherein Ar is an aryl group and R is an aryl or an alkyl group. Thus, taking diphenylguanidine as starting material, the following compounds are obtainable; mono-N-nitroso-diphenylguanidine ($C_6H_5N(NO) - C:(NH) - NHC_6H_5$) and di-N-nitroso-diphenylguanidine $$[C_6H_5N(NO)]_2C=NH$$

These compounds on heating tend to undergo molecular rearrangement, the nitroso (NO) group or groups migrating to the benzene ring with the formation of nitroso derivatives which are isomeric with the N-nitroso derivatives.

The N-nitroso derivatives and the rearranged isomeric p-nitroso derivatives exert a marked plasticising action on rubber or the like and the present invention includes a process for plasticising rubber or rubber-like materials which comprises masticating the rubber or rubber-like materials in the presence of the product of the reaction of nitrous acid on an aryl guanidine. The nitroso derivatives of the present invention may be used if desired together with known plasticising agents such as, for example, mercaptobenzthiazole and/or naphthyl mercaptan.

Aryl guanidines are already known as accelerators of vulcanisation but although the nitroso derivatives of the present invention are mild accelerators of vulcanisation the property is not so marked as in the case of aryl guanidines. The presence of mercaptobenzthiazole and diphenylguanidine in a rubber compound is undesirable owing to the tendency of the compound to "scorch," that is to vulcanise prematurely, but mercaptobenzthiazole and the nitroso derivatives of diphenylguanidine according to the present invention can safely be used jointly for plasticising purposes.

The present invention is illustrated by the following examples:

Example I

In this example we describe the preparation and uses of di-N-nitroso diphenylguanidine.

21 parts by weight of diphenylguanidine were dissolved in 29.5 parts by weight of concentrated hydrochloric acid and the solution was cooled to below 5° C. 17 parts by weight of sodium nitrite dissolved in 100 parts by weight of water were added dropwise to the cooled solution which was stirred continuously. The crude di-N-nitroso diphenylguanidine started to separate after about five minutes. The addition of the sodium nitrite solution was completed in 30 minutes and the mixture was stirred for a further 30 minutes, the external cooling of the reaction mixture being discontinued at this stage. The crude product was filtered off, washed twice with

hydrochloric acid, then twice with N sodium hydroxide solution and finally several times with water. The product was pressed out and dried in vacuo, when a light brown powder, melting point 116° C., was obtained in 90–95% yield of the theoretical amount.

The plasticising action of the di-N-nitroso diphenylguanidine is shown by the following experiments, the percentages given being percentages by weight calculated on the weight of the rubber.

Two batches of smoked sheet rubber containing (a) 0.5% of the di-N-nitroso diphenylguanidine and (b) 0.5% mercaptobenzthiazole were masticated for 30 minutes on an open mill at 70–80° C. under similar conditions. The plasticity of the rubber batches so obtained was determined by means of an extrusion plastometer in which the time taken to extrude a given weight of rubber at constant load and at constant temperature through a standard orifice is taken as a measure of the plasticity of the rubber. Batch (a) containing the di-N-nitroso diphenylguanidine had an extrusion time of 0.65 minute and batch (b) containing the mercaptobenzthiazole had an extrusion time of 1.36 minutes.

The di-N-nitroso diphenylguanidine may also be used with advantage in conjunction with other plasticising agents such as mercaptobenzthiazole or naphthyl mercaptan. Thus three batches of rubber masticated on an open mill under similar conditions with (a) 0.25% di-N-nitroso diphenylguanidine and 0.5% mercaptobenzthiazole, (b) 0.5% mercaptobenzthiazole and (c) 0.5% mercaptobenzthiazole and 0.25% of a proprietary product containing 33⅓% by weight of naphthyl mercaptan and 66⅔% by weight of a hydrocarbon wax, gave extrusion times of 0.64 minute, 1.36 minutes and 0.92 minute respectively.

The di-N-nitroso diphenylguanidine was also tried out as a plasticizer for rubber in an internal mixer of the Banbury type. 550 lbs. of smoked sheet rubber were mixed for a few minutes on a mill with 0.55 lb. (0.1% by weight calculated on the weight of rubber) of di-N-nitroso diphenylguanidine and 1.375 lbs. (0.25% by weight) mercaptobenzthiazole. The mixing was then transferred to a Banbury mixer and the following compounding ingredients were added:

Gas black _____ 230 lbs. (42% by weight)
Sulphur _____ 13.2 lbs. (2.4% by weight)
Zinc oxide _____ 22 lbs. (4% by weight)
Stearic acid _____ 15.4 lbs. (2.8% by weight)
Coumarone resin
 (known commercially as Tackol) ___ 26 lbs. (4.75% by weight)

The mixture was then masticated for 30 minutes at the end of which time a further 1.375 lbs. of mercaptobenzthiazole were added and mixed in. The plasticity of the final tread mixing, as determined by a parallel plate plastometer, was satisfactory and the mixing also extruded smoothly as a motor tyre tread, no overheating being noticed after prolonged running and no tendency to "scorching" being observed. The physical properties, for example tensile strength, hardness, resilience and abrasion resistance, of a vulcanised tread prepared from the compound were also satisfactory.

*Example II*

The procedure given in Example I was repeated using 23.9 parts by weight diorthotolyl guanidine in place of the diphenylguanidine. The product obtained was a yellow powder.

*Example III*

The rearrangement of the di-N-nitroso diphenylguanidine as prepared in Example I was effected as follows. The product from Example I was dissolved in the minimum quantity of dry alcohol and the solution cooled to below 5° C. A saturated solution of hydrochloric acid gas in dry ether was added rapidly to the cooled solution which turned dark orange in colour. After standing for three hours at room temperature excess of aqueous ammonia was added and the ether layer was separated, washed with water, again separated from the aqueous layer, dried over anhydrous sodium sulphate and the ether evaporated off on a water bath. The product obtained was a pink powder and melted at 140° C.

The effect of the pp'-di-nitroso diphenylguanidine on the mastication of rubber was similar to the effect of the di-N-nitroso diphenylguanidine.

Having now particularly described our invention, we claim:

1. A nitroso guanidine having the formula

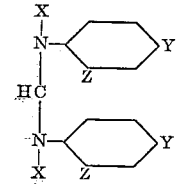

X and Y being members of the group consisting of H and NO one being H when the other is NO, and Z being a member of the group consisting of H and CH₃.

2. A nitroso ditolylguanidine having the formula

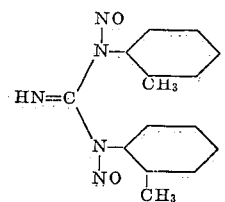

3. A nitroso ditolylguanidine having the formula

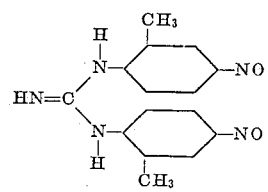

4. A nitroso diphenylguanidine having the formula

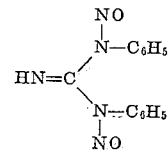

JOSEPH ARTHUR TEICHER.
DOUGLAS FRANK TWISS.

REFERENCES CITED

The following references are of record in the file of this patent:

UNITED STATES PATENTS

| Number | Name | Date |
|---|---|---|
| 1,547,815 | Jackman | July 28, 1925 |
| 2,035,698 | Fisher | Mar. 31, 1936 |
| 2,088,920 | Pickett | Aug. 3, 1937 |
| 2,183,342 | Williams | Dec. 12, 1939 |

OTHER REFERENCES

Beilstein, Handbuch der Organische Chemie, 4th edition, vol. 24, pp. 117 and 128.
Beilstein, Handbuch der Organische Chemie, 4th edition, vol. III/IV (second sup.), page 99.
Chemical Abstracts, vol. 32 (1938), p. 502.